H. P. KRAFT.
RIM NUT OR THE LIKE.
APPLICATION FILED DEC. 16, 1916.
1,302,381. Patented Apr. 29, 1919.
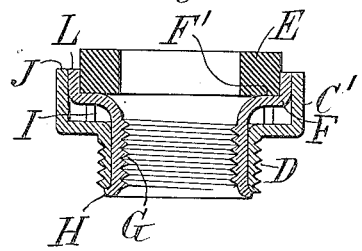
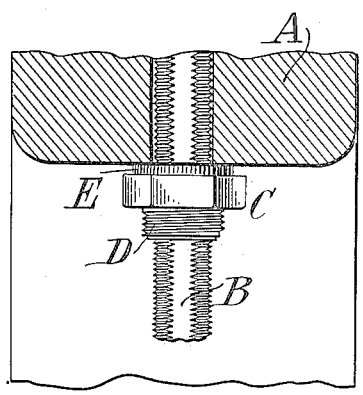
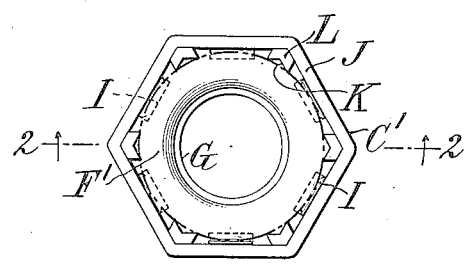
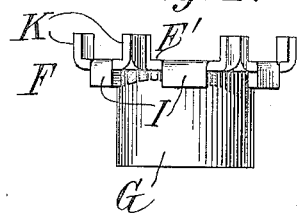
WITNESSES:
INVENTOR:
Henry P. Kraft
By Attorneys,

UNITED STATES PATENT OFFICE.

HENRY P. KRAFT, OF RIDGEWOOD, NEW JERSEY.

RIM-NUT OR THE LIKE.

1,302,381.  Specification of Letters Patent.  Patented Apr. 29, 1919.

Application filed December 16, 1916. Serial No. 137,324.

*To all whom it may concern:*

Be it known that I, HENRY P. KRAFT, a citizen of the United States of America, residing in Ridgewood, in the county of Bergen and State of New Jersey, have invented certain new and useful Improvements in Rim-Nuts or the like, of which the following is a specification.

This invention relates to sheet metal nuts, washers, or similar devices, and particularly of the kind wherein the device is constructed of two pieces of sheet metal drawn to appropriate form and united by flanging, soldering or otherwise. The invention is particularly directed to a nut for use in connection with pneumatic tire valves, chiefly those which are used as rim nuts and which are provided with bushings at their upper ends, designed to receive a dust cap. Such nuts are best formed with an exterior shell which is usually hexagonal in contour, and an interior lining piece having a recess which is adapted to receive a leather or other washer which makes a contact with the rim of the wheel. Particular features of the invention will be hereinafter more fully described.

Referring to the drawings which illustrate the preferred form of the invention,—

Figure 1 is a cross sectional view of the rim showing the nut in elevation;

Fig. 2 is a diametrical section of the nut;

Fig. 3 is an underside view of the nut;

Fig. 4 is an elevation of the lining member detached.

Referring first to Fig. 1, let A indicate the wheel rim or felly, B a pneumatic tire valve and C the nut as a whole. In this construction the nut is formed with a screw-threaded projection or bushing which is designed to receive the dust cap. This feature may be omitted, and in fact, the nut may be constructed as a washer if desired.

Referring now to Figs. 2, 3 and 4, let $C^1$ indicate the outer shell or body of the nut which is formed of sheet metal. When the nut is to be provided with a bushing the shell $C^1$ may be constructed with a tubular extension D which may be externally screw-threaded as shown. For economy the gage of metal employed is light and the interior recess formed on the shell or body $C^1$ of the nut is too deep for a packing washer such as E which is usually formed of leather. Hence, in order to maintain the washer in a sufficiently extended position, a lining member F is employed which is fitted in the recess of the shell or body portion $C^1$ and it is formed with a much shallower recess, the bottom of which constitutes a washer seat $F^1$. To provide an internal thread for the nut, the lining member is usually formed with a tubular extension G which is interiorly screw-threaded as shown. The parts are commonly united by flanging or riveting the internal extension over the external, as indicated at H. The parts are prevented from relative rotation by forming the lining member with a hexagonal shape adapted to fit the internal shape of the body portion C.

To prevent axial movement of the lining member relatively to the body when the device is screwed on a valve shell, a series of lugs I are provided which are bent back to engage the body member as shown. As formerly constructed, the entire metal was bent back in this direction in the form of a flange. In the use of these devices the packing washer E is sometimes lost, or is compressed until the edge J of the nut body has contacted with the rim. When this occurs a further tightening of the nut forces the lining member still farther inward while the body is arrested by the wheel rim. When this occurs the flange connection H is apt to become destroyed so that the sections are parted. In order to prevent this, instead of turning back all of the metal, portions thereof such as the lugs I are turned back, and portions are turned forward as shown at K. The forward faces L of these portions lie flush with the face J, and when the latter contacts with the rim the faces L contact also so that the lining member cannot advance ahead of the body member when the nut is tightened, and the permanance of the connection H is thereby assured. It is preferable to utilize a circular packing instead of one which has a hexagonal contour, and in order to accommodate as large a packing as possible the lugs K are preferably located at the angles of the body portion, as best seen in Fig. 3. By so locating the lugs a circular packing washer of maximum diameter can be utilized; in other words, the provision of the lugs does not reduce the diameter of a packing which could otherwise be employed with a hexagonal nut. This is indicated in dotted lines in Fig. 3.

The invention is applicable to other constructions than that described, such as sheet metal washers or the like, and within the scope of the appended claims the parts may be varied without departing from the spirit of the invention.

What I claim is:—

1. A device of the character described having a body portion and an interior lining member connected to the body portion by means acting under normal conditions to prevent their relative axial movement, the lining member having parts extending to the forward face of the body portion.

2. A device of the character described having a body portion and an interior lining member connected with the body portion by means acting under normal conditions to prevent their relative axial movement, having a washer seat spaced forwardly from the body portion, and said lining member having parts extending forwardly to the front face of the body portion.

3. A device of the character described comprising a body portion and an interior lining member connected with the body portion by means acting under normal conditions to prevent their relative axial movement, the latter having a washer seat spaced forwardly from the body portion and having lugs extending in reverse directions, one set contacting with the body portion and the other extending forwardly to the front face of the body portion.

4. A device of the character described comprising a sheet metal body portion having a tubular extension, a lining member connected to said body portion and formed with a screw thread, said parts formed with lugs limiting their relative axial movement in both directions.

5. A device of the character described comprising a sheet metal body portion having a tubular extension, a lining portion having a tubular extension within the extension of the body portion and formed with a screw thread, a connection between said extensions to normally hold the parts together, and lugs on the lining portion extending forwardly to the front face of the body member.

6. A device of the character described comprising a sheet metal body portion having a tubular extension, a lining portion having a tubular extension within the extension of the body portion and formed with a screw thread, a connection between said extensions to normally hold the parts together, and lugs on the lining portion extending forwardly to the front face of the body member, and lugs extending rearwardly to contact with the body member.

7. A device of the character described comprising a sheet metal body member of polygonal form and having an externally threaded tubular extension, an internal lining member of similar form having an internally threaded tubular extension arranged within the first, a connection between said extensions, and lugs formed on the lining member extending forwardly to the front face of the body member, said lugs arranged in the angles of the body member.

8. A device of the character described comprising a sheet metal body member of polygonal form and having an externally threaded tubular extension, an internal lining member of similar form having an internally threaded tubular extension arranged within the first, a connection between said extensions, lugs formed on the lining member extending forwardly to the front face of the body member, said lugs arranged in the angles of the body member, and intermediate lugs extending rearwardly to the body member.

In witness whereof, I have hereunto signed my name.

HENRY P. KRAFT.